(12) United States Patent
Danjo

(10) Patent No.: US 10,221,318 B2
(45) Date of Patent: Mar. 5, 2019

(54) HYDROPHILIZATION TREATMENT AGENT FOR ALUMINUM-CONTAINING METAL MATERIAL

(71) Applicant: Nihon Parkerizing Co., Ltd., Tokyo (JP)

(72) Inventor: Yoshihide Danjo, Tokyo (JP)

(73) Assignee: NIHON PARKERIZING CO., LTD., Tokyo (JP)

(*) Notice: Subject to any disclaimer, the term of this patent is extended or adjusted under 35 U.S.C. 154(b) by 126 days.

(21) Appl. No.: 15/502,137

(22) PCT Filed: Aug. 8, 2014

(86) PCT No.: PCT/JP2014/071103
§ 371 (c)(1),
(2) Date: Feb. 6, 2017

(87) PCT Pub. No.: WO2016/021071
PCT Pub. Date: Feb. 11, 2016

(65) Prior Publication Data
US 2017/0226345 A1  Aug. 10, 2017

(51) Int. Cl.
| | |
|---|---|
| C09C 1/28 | (2006.01) |
| C09C 3/10 | (2006.01) |
| C09C 3/12 | (2006.01) |
| C09K 3/00 | (2006.01) |
| F28F 13/18 | (2006.01) |
| C09C 1/64 | (2006.01) |
| C09D 129/04 | (2006.01) |
| C09C 1/40 | (2006.01) |
| C09C 3/00 | (2006.01) |
| C08K 3/36 | (2006.01) |
| C08K 5/5419 | (2006.01) |
| C08K 13/02 | (2006.01) |

(52) U.S. Cl.
CPC .............. *C09C 1/28* (2013.01); *C09C 1/40* (2013.01); *C09C 1/64* (2013.01); *C09C 1/642* (2013.01); *C09C 1/644* (2013.01); *C09C 3/00* (2013.01); *C09C 3/10* (2013.01); *C09C 3/12* (2013.01); *C09D 129/04* (2013.01); *C09K 3/00* (2013.01); *F28F 13/18* (2013.01); *C08K 3/36* (2013.01); *C08K 5/5419* (2013.01); *C08K 13/02* (2013.01); *C09C 3/006* (2013.01)

(58) Field of Classification Search
CPC .... C09C 1/28; C09C 1/40; C09C 3/00; C09C 3/10; C09C 3/12; C09K 3/00; F28F 13/18
USPC ........................................................ 428/402
See application file for complete search history.

(56) References Cited

U.S. PATENT DOCUMENTS

| | | |
|---|---|---|
| 2002/0042467 A1 | 4/2002 | Matsukawa et al. |
| 2003/0065085 A1 | 4/2003 | Nakada et al. |
| 2009/0030150 A1 | 1/2009 | Lu et al. |
| 2011/0180248 A1 | 7/2011 | Yoshida et al. |
| 2013/0196167 A1 | 8/2013 | Kataoka |
| 2015/0232681 A1 | 8/2015 | Osako et al. |

FOREIGN PATENT DOCUMENTS

| | | | |
|---|---|---|---|
| JP | 59-170170 | * | 9/1984 |
| JP | S59-170170 A | | 9/1984 |
| JP | 01-223188 | * | 9/1989 |
| JP | H01-223188 A | | 9/1989 |
| JP | H06-221786 A | | 8/1994 |
| JP | H06-300482 A | | 10/1994 |
| JP | 2000-026857 A | | 1/2000 |
| JP | 2000-328038 A | | 11/2000 |
| JP | 2001-172547 | * | 6/2001 |
| JP | 2001-172547 A | | 6/2001 |
| JP | 4447115 B2 | | 4/2010 |
| JP | 2010-185024 A | | 8/2010 |
| JP | 2011-153343 A | | 8/2011 |
| JP | 2012-087213 A | | 5/2012 |
| JP | 5497971 B1 | | 5/2014 |
| WO | 2001/053428 A1 | | 7/2001 |
| WO | 2010/092875 A1 | | 8/2010 |

OTHER PUBLICATIONS

Office Action issued in corresponding Chinese Application No. 201480080839.9; dated Dec. 19, 2017 (13 pages).
Notice of Preliminary Rejection issued in corresponding Korean Application No. 10-2017-7005678; dated Jan. 15, 2018 (13 pages).
International Search Report issued PCT/JP2014/071103, dated Apr. 7, 2015 (5 pages).
Written Opinion of the International Searching Authority issued in PCT/JP2014/071103, dated Apr. 7, 2015 (3 pages).
Extended European Search Report issued in European Application No. 14899380.1, dated Apr. 6, 2018 (8 pages).
PCT International Preliminary Report on Patentability dated Feb. 14, 2017, by the International Bureau of WIPO in corresponding International Application No. PCT/JP2014/071103, with English translation (8 pages).

* cited by examiner

*Primary Examiner* — Leszek B Kiliman
(74) *Attorney, Agent, or Firm* — Osha Liang LLP

(57) ABSTRACT

Provided is a hydrophilization treatment agent for an aluminum-containing metal material, for forming a film that can provide excellent hydrophilicity and hydrophilic sustainability, as well as odor property to an aluminum-containing metal material for use in a heat exchanger or the like.

The hydrophilization treatment agent for an aluminum-containing metal material contains: organic-inorganic composite particles obtained by combining a water-soluble resin (A) having a hydroxyl group, a poorly water-soluble inorganic oxide (B), an organoalkoxysilane (C), and a surfactant (D) at specific ratios; and water, and the organic-inorganic composite particles are 40 to 100 mass % based on total solid content by mass.

16 Claims, No Drawings

HYDROPHILIZATION TREATMENT AGENT FOR ALUMINUM-CONTAINING METAL MATERIAL

TECHNICAL FIELD

The present invention relates to a hydrophilization treatment agent for an aluminum-containing metal material, a hydrophilization treatment method for an aluminum-containing metal material, and a method for manufacturing a hydrophilized aluminum-containing metal material. More particularly, the present invention relates to a hydrophilization treatment agent or the like for forming a film that can provide and sustain excellent hydrophilicity to an aluminum-containing metal material for use in a heat exchanger or the like.

BACKGROUND ART

Conventionally, heat exchangers for use in air conditioning machines, air conditioners for automobiles, and the like are often formed from aluminum-containing metal materials from the perspective of advantages such as workability and thermal conductivity, and in order to increase the heat exchange efficiencies, the intervals between the aluminum-containing metal materials (generally referred to as fins) at blast sites are designed to be highly narrow. In the heat exchangers, dew condensation is caused through condensation of water in the atmosphere on the fins when the air conditioners are operated (cooled), and as the hydrophobicity of the fin surfaces are higher, the dew condensation water becomes bulky water droplets, thereby making clogging more likely to be caused between the fins. The generation of clogging increases the ventilation resistance and decreases the heat exchange efficiency, thereby failing to achieve the original performance of the heat exchanger. In addition, the clogging may also increase noises in blast. In order to solve these problems, methods of providing hydrophilicity to the surfaces of aluminum-containing metal materials and heat exchanger members have been proposed, and implemented (Patent Literature 1, Patent Literature 2, Patent Literature 3).

As the methods of providing hydrophilicity, hydrophilization treatment agents containing inorganic substances as their main constituents (hereinafter, referred to as inorganic hydrophilization treatment agents) (see Patent Literature 1, Patent Literature 2, and Patent Literature 3), hydrophilization treatment agents containing, as their main constituents, resins or organic substances such as polyvinyl alcohol, polyvinylpyrrolidone, and polyacrylic acid (hereinafter, referred to as organic hydrophilization treatment agents), and the like have been proposed and implemented (see Patent Literature 4, Patent Literature 5, Patent Literature 6, Patent Literature 7, and Patent Literature 8).

In this regard, aluminum-containing metal materials and heat exchangers provided with hydrophilicity through the use of the inorganic hydrophilization treatment agents can sustain high hydrophilicity for a long period of time with excellent durability, but at the same time, have problems with odor properties, such as generation of film odors unique to the inorganic substances (dusty odors, hereinafter referred to as dust odors). On the other hand, when the organic hydrophilization treatment agents are used, the problems with dust odors are reduced, but at the same time, organic substances as hydrophilic constituents are likely to flow off, and it is thus difficult to sustain hydrophilicity over long period of time, thereby resulting in problems with durability. In order to remedy these problems, hydrophilization treatment agents have been proposed which have silica particles as inorganic substances dispersed in polyvinyl alcohol, thereby remedying dust odors unique to silica (see Patent Literature 9 and Patent Literature 10). However, films from the hydrophilization treatment agents with the silica particles simply dispersed in polyvinyl alcohol have the problem of generating dust odors as a result of exposing the silica particles due to the polyvinyl alcohol flowing off through long-term use.

CITATION LIST

Patent Literature

Patent Literature 1: JP 2000-328038 A
Patent Literature 2: WO 2001-053428
Patent Literature 3: JP H6-300482 A
Patent Literature 4: JP H6-221786 A
Patent Literature 5: JP 2012-87213 A
Patent Literature 6: JP 2013-547425 A
Patent Literature 7: JP 2010-185024 A
Patent Literature 8: JP 2000-26857 A
Patent Literature 9: JP 4447115
Patent Literature 10: JP 2011-153343 A

SUMMARY OF INVENTION

Technical Problem

The present invention has solved the problems of the prior art, and an object of the invention is to provide a hydrophilization treatment agent for an aluminum-containing metal material, for forming a film that can provide excellent hydrophilicity and hydrophilic sustainability, as well as odor property to an aluminum-containing metal material for use in a heat exchanger or the like. In addition, another object of the present invention is to provide a hydrophilization treatment method for an aluminum-containing metal material, a method for producing a hydrophilized aluminum-containing metal material, and a hydrophilized aluminum-containing metal material and a heat exchanger using the material.

Solution to Problem

The present invention (1) is a hydrophilization treatment agent for an aluminum-containing metal material, the hydrophilization treatment agent containing: organic-inorganic composite particles obtained by combining one or more selected from water-soluble resins (A) having a hydroxyl group, one or more selected from poorly water-soluble inorganic oxides (B), one or more selected from organoalkoxysilanes (C), and a surfactant (D) such that $(C)/\{(B)+(D)\}$ and $(A)/\{(B)+(C)+(D)\}$ are respectively 0.001 to 1.0 and 0.1 to 5.0 in solid content ratio by weight; and water, where the organic-inorganic composite particles are 40 to 100 mass % based on total solid content by mass. The film formed by drying after bringing the hydrophilization treatment agent into contact with an aluminum-containing metal material has remedied problems with odor properties such as dust odors, and can sustain excellent hydrophilicity. When the film is applied to an aluminum-containing metal material constituting a heat exchanger or the like, or to a heat exchanger, problems can be solved such as a heat-exchange efficiency decreased due to clogging with dew condensation water, and noises.

In this regard, the water-soluble resins (A) having a hydroxyl group may be constituents (a), which are polyvinyl alcohol and/or derivatives of polyvinyl alcohol, with a saponification degree of 90 mol % or more.

In addition, the surfactant (D) may have a surface tension of 15 to 65 mN/m (25° C., 0.1 mass % aqueous solution, a wilhelmy method).

In addition, the surfactant (D) may be a non-ionic surfactant.

In addition, the combination ratio of (D)/{(A)+(B)+(C)+(D)} may be 0.0001 to 0.03 in solid content ratio by weight.

In addition, the combination ratio of (C)/{(B)+(D)} may be 0.01 to 1.0 in solid content ratio by weight.

In addition, the water-soluble resins (A) having a hydroxyl group may have a weight average molecular weight of 5,000 to 50,000.

In addition, the organoalkoxysilanes (C) may include at least a constituent having one or more glycidyl groups.

In addition, the poorly water-soluble inorganic oxides (B) may be inorganic oxides having Si.

The present invention (2) is a hydrophilization treatment method for an aluminum-containing metal material, which includes a step of drying after bringing the hydrophilization treatment agent into contact with the aluminum-containing metal material. More specifically, the present hydrophilization treatment method includes a step of forming a film by drying after partially or entirely bringing an aluminum-containing metal material subjected to no treatment, or subjected to a cleaning treatment and/or a rust-proof treatment, into contact with the hydrophilization treatment agent for an aluminum-containing metal material according to the present invention.

The present invention (3) is a method for producing a hydrophilized aluminum-containing metal material, the method comprising a step of drying after bringing the hydrophilization treatment agent into contact with the aluminum-containing metal material.

The present invention (4) is a hydrophilized aluminum-containing metal material obtained by the method for producing. More specifically, the present aluminum-containing metal material has a hydrophilic film partially or entirely formed, which is obtained from the hydrophilization treatment agent for an aluminum-containing metal material according to the present invention.

The present invention (5) is a heat exchanger using the hydrophilized aluminum-containing metal material. More specifically, the present heat exchanger has a hydrophilic film partially or entirely formed, which is obtained from the hydrophilization treatment agent for an aluminum-containing metal material according to the present invention.

The present invention (6) is a hydrophilization treatment method for a heat exchanger, which includes a step of drying after bringing the hydrophilization treatment agent into contact with the heat exchanger (that is, a method of applying an immersion treatment to a completed heat exchanger).

The present invention (7) is a method for manufacturing a hydrophilized heat exchanger, which includes a step of drying after bringing the hydrophilization treatment agent into contact with the heat exchanger (that is, a method of manufacturing a hydrophilized heat exchanger by applying an immersion treatment to a completed heat exchanger).

The present invention (8) is a hydrophilized heat exchanger obtained by the manufacturing method.

Advantageous Effects of Invention

The film formed drying after bringing the hydrophilization treatment agent for an aluminum-containing metal material according to the present invention into contact with an aluminum-containing metal material has excellent hydrophilicity and odor property. Therefore, for example, when the hydrophilization is applied to an aluminum-containing metal material constituting a heat exchanger or the like, or to a heat exchanger, excellent hydrophilicity can be provided which solves the problems of a heat-exchange efficiency decreased and noises due to clogging with dew condensation water. Furthermore, the hydrophilic film formed by the hydrophilization treatment method according to the present invention can sustain excellent hydrophilicity and odor property even in long-term use.

The aluminum-containing metal material according to the present invention has a hydrophilic film formed, which has excellent hydrophilicity for solving problems such as a heat-exchange efficiency decreased and noises due to clogging with dew condensation water, the practical value of the material is thus extremely high when the material is applied to a heat exchanger, and the material not only has high adaptability to heat exchangers, but also can be applied in other wide ranges of uses.

DESCRIPTION OF EMBODIMENTS

A hydrophilization treatment agent for an aluminum-containing metal material, a hydrophilization treatment method, and hydrophilized aluminum-containing metal material and heat exchanger according to the present invention will be described in more detail with reference to embodiments. It is to be noted that the term "to" indicating ranges of numerical values in this specification and within the scope of the claims also encompasses upper limits and lower limits, unless otherwise specified. For example, the range "X to Y" means X or more and Y or less, unless otherwise specified.

<<Hydrophilization Treatment Agent for Aluminum-Containing Metal Material>>

A hydrophilization treatment agent for an aluminum-containing metal material according to the present invention (hereinafter, abbreviated as a "hydrophilization treatment agent") at least contains: organic-inorganic composite particles obtained by combining one or more selected from water-soluble resins (A) having a hydroxyl group, one or more selected from poorly water-soluble inorganic oxides (B), one or more selected from organoalkoxysilanes (C), and a surfactant (D) such that (C)/{(B)+(D)} and (A)/{(B)+(C)+(D)} are respectively 0.001 to 1.0 and 0.1 to 5.0 in solid content ratio by weight; and water, and contains the organic-inorganic composite particles at 40 to 100 mass % based on total solid content by mass. The respective constituents of the hydrophilization treatment agent will be described in detail below.

[Constituent: Organic-Inorganic Composite Particle]

First, the organic-inorganic composite particles will be described. The organic-inorganic composite particles included in the hydrophilization treatment agent refer to a constituent obtained by combining at least one or more selected from water-soluble resins (A) having a hydroxyl group, one or more selected from poorly water-soluble inorganic oxides (B), one or more selected from organoalkoxysilanes (C), and a surfactant (D) such that (C)/{(B)+(D)} and (A)/{(B)+(C)+(D)} are respectively 0.001 to 1.0 and 0.1 to 5.0 in solid content ratio by weight. The essential raw materials (A) to (D) will be first described below, and the combination ratios between the essential raw materials and a method for producing the organic-inorganic composite particles will be then described.

(Essential Raw Material/Water-Soluble Resin (A) Having Hydroxyl Group)

The water-soluble resins (A) having a hydroxyl group can be used without any particular limitation as long as the resins have a hydroxyl group for dehydration condensation with the organoalkoxysilanes, and include, for example, polyvinyl alcohol and derivatives of the polyvinyl alcohol, polyethylene glycol and derivatives of the polyethylene glycol, cellulose and cellulose derivatives, and chitosan and chitosan derivatives. Above all, for the perspective of lasting hydrophilicity and an odor property over a long period of time, water-soluble resins that are high in hydroxyl group density are preferred, and one or more selected from polyvinyl alcohol and/or derivatives of the polyvinyl alcohol preferably have a saponification degree of 90 mol % or more. It is to be noted that the term "water-soluble" represents a polymeric substance that has a solubility of 0.1 mass % or more in water at a room temperature of 20° C., and the solubility is preferably 0.5 mass % or more, in particular, more preferably 1 mass % or more.

The weight average molecular weight of the water-soluble resin (A) having a hydroxyl group is not to be considered particularly limited as long as the resin can coat the surface of the poorly water-soluble inorganic oxide, but from the perspective of sufficient coating, the weight average molecular weight is preferably 5,000 to 100,000, more preferably 5,000 to 50,000. In particular, the weight average molecular weight is further preferably 30,000 or less (the lower limit is not particularly limited, but for example, 5,000). Especially, when the water-soluble resin (A) having a hydroxyl group has one or more selected from polyvinyl alcohol and/or derivatives of the polyvinyl alcohol, and has a saponification degree of 90 mol % or more, the weight average molecular weight is particularly preferably 30,000 or less (the lower limit is not particularly limited, but for example, 5,000). The weight average molecular weight herein refers to a weight average molecular weight obtained by a measurement method such as a GPC method and a viscosity method. The weight average molecular weight of the water-soluble resin according to the present invention was measured by a GPC-LALLS method. The measurement was made under the following conditions.

1) GPC

Equipment: 244-type gel permeation chromatography from Waters

Column: TSK from Tosoh Corporation (internal diameter: 8 mm, length: 30 cm, two columns)

Solvent: 0.1 M-Tris Buffer (pH 7.9)

Flow Rate: 0.5 ml/min

Temperature: 23° C.

Sample Concentration: 0.04%

Filtration: 0.45 μm MYSYORI-DISC W-25-5 from Tosoh Corporation

Injection Volume: 0.2 ml

2) LALLS

Equipment: KMX-6-type low-angle laser light scattering photometer from Chromatrix Temperature: 23° C.

Wavelength: 633 nm

Second Virial Coefficient×Concentration: 0 mol/g

Change in Refractive Index with Concentration (dn/dc): 0.159/g

Filter: 0.45 μm filter HAWPO1300 from MILLIPORE

Gain: 800 mV (Essential Raw Material/Poorly Water-Soluble Inorganic Oxide (B))

Next, the poorly water-soluble inorganic oxide (B) will be described. The poorly water-soluble inorganic oxide is not to be considered particularly limited as long as the inorganic oxide is poorly soluble in water, and for example, zinc oxide, cerium (IV) oxide, titanium (IV) oxide, tin (II) oxide, zirconium (IV) oxide, silicon (IV) oxide, aluminum (III) oxide, cobalt (II) oxide, nickel (II) oxide, ruthenium (IV) oxide, palladium (II) oxide, vanadium (V) oxide, lithium oxide, niobium (V) oxide, zinc (II) oxide, silicon (IV) oxide-aluminum (III) oxide composite oxide, titanium (IV) oxide-aluminum (III) oxide composite oxide, iron (III) oxide, and magnesium (II) oxide can be used. Above all, for the composite of the organoalkoxysilane and the water-soluble resin having a hydroxyl group at the surface of the poorly water-soluble inorganic oxide, and the stable dispersion of the organic-inorganic composite particles in a water solvent, one or more selected from inorganic oxides that have at least one or more elements selected from Ce, Ti, Sn, Zr, Si, Al, and Zn are preferred, and one or more selected from inorganic oxides that have Si are more preferred. It is to be noted that the "poorly water-soluble" refers to a solubility of 1 mass % or less in water at 20° C.

In addition, the form of the poorly water-soluble inorganic oxide is not to be considered particularly limited, but the oxide can be used in any form such as a solid powder and a sol state dispersed in a solvent.

The particle size of the poorly water-soluble inorganic oxide is not to be considered particularly limited as long as the composite of the organoalkoxysilane and the water-soluble resin having a hydroxyl group is obtained at the surface of the poorly water-soluble inorganic oxide, but preferably 1 nm to 200 nm, more preferably 1 nm to 100 nm from the perspective of stably dispersing the obtained organic-inorganic composite particles in a water solvent, and achieving better hydrophilicity. As the poorly water-soluble inorganic oxide is larger in particle size, a precipitate may be developed in long-term storage.

It is to be noted that the "particle size" in the present invention refers to an accumulated mean diameter (Median diameter) in the measurement by a dynamic light scattering method, regardless of whether primary particles or secondary particles. Measurement instruments in accordance with a dynamic light scattering method include, for example, UPA-EX150 from Nikkiso Co., Ltd. The dynamic light scattering method, by making use of the fact that the movement rate (Brownian motion) varies depending on particle sizes in a solution, irradiates the solution with laser light, observes the scattering light with a photon detector, and applies a frequency analysis to the light, thus making it possible to obtain a particle size distribution. The particle size measurement in the present invention was made under the following conditions.

(Particle Size Measurement Condition)

Measurement Equipment: UPA-EX150 from Nikkiso Co., Ltd.

Light Source: semiconductor laser 780 nm, 3 mW

Light Source Probe: internal probe system

Adjustment of Measurement Sample: diluted with deionized water so as to provide the solid content concentration of the poorly water-soluble inorganic oxide (B) on the order of 0.01%, and then well dispersed by stirring Measurement Time: 180 seconds Circulation: no Particle Penetration: penetrated Shape: Non-spherical Refractive Index: 1.81 (the default setting of the equipment)

Solvent: water
Solvent Refractive Index: 1.333
(Essential Raw Material/Organoalkoxysilane (C))

Next, the organoalkoxysilane (C) will be described. The organoalkoxysilane is not to be considered particularly limited as long as the organoalkoxysilane develops dehydration condensation with the poorly water-soluble inorganic oxide and the water-soluble resin having a hydroxyl group, but for example, a silane coupling agent can be used. However, for the good composite with the poorly water-soluble inorganic oxide and the water-soluble resin having a hydroxyl group, one or more selected from alkoxysilanes having one or more glycidyl groups are preferred, and the alkoxysilanes include, for example, 2-(3,4-epoxycyclohexyl)ethyltrimethoxysilane, 3-glycidoxypropylmethyldimethoxysilane, 3-glycidoxypropylmethyldiethoxysilane, and 3-glycidoxypropyltrimethoxysilane.

(Essential Raw Material/Surfactant (D))

Next, the surfactant (D) will be described. The surfactant (D) is not to be considered particularly limited as long as the surfactant suppresses agglomeration when the poorly water-soluble inorganic oxide, and the organoalkoxysilane and the water-soluble resin having a hydroxyl group are mixed to make a composite, and as long as the stability of particles obtained is not disturbed, but for example, non-ionic surfactants, anionic surfactants, cationic surfactants, and ampholytic surfactants can be used.

The non-ionic surfactants include: polyoxyethylenealkylethers such as polyoxyethylenelaurylethers, polyoxyethylenestearylethers, and polyoxyethylene cetyl ethers; polyoxyethylene octylphenyl ethers; polyoxyethylene alkyl allyl ethers; polyoxyethylene derivatives; oxyethylene-oxypropylene block copolymers; sorbitan fatty acid esters such as sorbitan monolaurate, sorbitan monostearate, and sorbitan trioleate; glycerin fatty acid esters; polyoxyethylene fatty acid esters; and fluorochemical surfactants.

The anionic surfactants include: fatty acid salts such as sodium stearate and potassium oleate; alkyl sulfate esters such as sodium lauryl sulfate, triethanolamine lauryl sulfate, and ammonium lauryl sulfate; alkylbenzene sulfonates; alkylnaphthalene sulfonates; alkyl sulfosuccinates; alkyl diphenyl ether disulfonates; alkylphosphates; polyoxyethylene alkyl sulfate esters; fluorochemical surfactants; and silicone surfactants.

The cationic surfactants include: alkylamine salts such as stearyl amine acetates and stearylamine hydrochloride; quaternary ammonium salts such as lauryl trimethyl ammonium chloride, stearyl trimethyl ammonium chloride, and distearyl dimethyl ammonium; alkyl betaines such as lauryl betaine and stearyl betaine; amine oxide; fluorochemical surfactants; and silicone surfactants.

The ampholytic surfactants include imidazoline ampholytic surfactants, glycine ampholytic surfactants, and amine oxide ampholytic surfactants.

In addition, the surface tension (25° C., 0.1 mass % aqueous solution, wilhelmy method) of the surfactant (D) is not to be considered particularly limited as long as the surfactant suppresses agglomeration when the poorly water-soluble inorganic oxide, and the organoalkoxysilane and the water-soluble resin having a hydroxyl group are mixed to make a composite, and as long as the stability of particles obtained is not disturbed, but from the perspective of suppressing agglomeration in making the composite, and making it possible for an obtained film to sustain hydrophilicity and an odor property over a long period of time, the surface tension of the surfactant (D) is preferably 15 to 65 mN/m, more preferably 15 to 55 mN/m, and further preferably 15 to 45 mN/m. When the surface tension is lower than 15 mN/m, the retention of composite particles in an obtained film may be decreased, and the hydrophilicity may be decreased after a durability test. Alternatively, when the surface tension is higher than 65 mN/m, agglomeration may be suppressed insufficiently in making the composite, and the odor property of an obtained film may be decreased.

Furthermore, the surfactant (D) is preferably one or more selected from the non-ionic surfactants from the perspective of suppressing agglomeration in making the composition by mixing the poorly water-soluble inorganic oxide, the organoalkoxysilane, and the water-soluble resin having a hydroxyl group, and further enhancing the odor property.

The surface tension in the present invention is one of properties of a surfactant, and refers to a value measured by a wilhelmy method. Measurement instruments in accordance with a wilhelmy method include, for example, a CBVP surface tensiometer A3 from Kyowa Interface Science Co., Ltd. According to the wilhelmy method, when a gauge head (hereinafter, referred to as a plate) is brought into contact with the surface of a liquid, the liquid wets the gauge head upward, and a surface tension acts along the circumference of the plate, thereby trying to draw the plate into the liquid. The surface tension can be measured by reading the drawing force. The measurement of the surface tension according to the present invention was made under the following conditions.

(Surface Tension Measurement Condition)

Measurement Instrument: CBVP surface tensiometer A3 from Kyowa Interface Science Co., Ltd.

Gauge Head (plate): plate made of platinum

Adjustment of Measurement Sample: diluted with deionized water so as to adjust the solid content concentration of the surfactant (D) to 0.1 mass %, and then well stirred, thereby providing an aqueous solution Measurement Temperature: 25° C.

(Combination Ratio)

The $(C)/\{(B)+(D)\}$ is adjusted to 0.001 to 1.0, preferably 0.01 to 1.0, more preferably 0.01 to 0.5. The $(C)/\{(B)+(D)\}$ of less than 0.001 in solid content ratio by weight results in organic-inorganic composite particles with an insufficient composite made from the organoalkoxysilane (C) and the water-soluble resin (A) having a hydroxyl group for the surface of the poorly water-soluble inorganic oxide (B), and in the long-term use of an obtained film, the water-soluble resin having a hydroxyl group flows off, thereby generating a dust odor. The $(C)/\{(B)+(D)\}$ of more than 1.0 in solid content ratio by weight sufficiently progresses a composition made from the organoalkoxysilane and the water-soluble resin having a hydroxyl group for the surface of the poorly water-soluble inorganic oxide, but because of an excessively large number of coupling points between the poorly water-soluble inorganic oxide and the water-soluble resin, the hydrophilicity of an obtained film is insufficient.

In addition, the $(A)/\{(B)+(C)+(D)\}$ is adjusted to 0.1 to 5.0, preferably 0.1 to 2.5, more preferably 0.1 to 1.0. The $(A)/\{(B)+(C)+(D)\}$ of less than 0.1 in solid content ratio by weight results in, because of the excessively small amount of the water-soluble resin (A) having a hydroxyl group, an insufficient composite made from the water-soluble resin (A) having a hydroxyl group for the surface of the poorly water-soluble inorganic oxide (B), and an obtained film generates a dust odor. The ratio of more than 5.0 provides a sufficient composition for organic-inorganic composite particles, but much of the water-soluble resin having a hydroxyl group, which is not involved in the formation of the organic-inorganic composite particles, flows off by water, thus resulting in inferior durability.

In addition, the (D)/{(A)+(B)+(C)+(D)} is not to be considered particularly limited, as long as agglomeration is suppressed when the poorly water-soluble inorganic oxide, and the organoalkoxysilane and the water-soluble resin having a hydroxyl group are mixed to make a composite, and as long as the stability of particles obtained is not disturbed, but preferably 0.0001 to 0.03, more preferably 0.001 to 0.03, and further preferably 0.001 to 0.01. When the (D)/{(A)+(B)+(C)+(D)} is less than 0.0001 in solid content ratio by weight, the surfactant (D) may insufficiently suppress agglomeration, thereby decreasing the odor property and durability. Alternatively, when the (D)/{(A)+(B)+(C)+(D)} is more than 0.03 in solid content ratio by weight, because of the excessive surfactant (D) dissolved in water, organic-inorganic composite particles may be retained insufficiently in an obtained film, resulting in insufficient durability.

(Method for Producing Organic-Inorganic Composite Particles)

The organic-inorganic particles are obtained by making a composite of the organoalkoxysilane and the water-soluble resin having a hydroxyl group at the surface of the poorly water-soluble inorganic oxide. For more detail, the particles are obtained by making a composition through dehydration condensation between surface hydroxyl groups of the poorly water-soluble inorganic oxide and the organoalkoxysilane and dehydration condensation between the organoalkoxysilane and the water-soluble resin having a hydroxyl group. The method for making the composition is not to be considered particularly limited as long as a dehydration condensation reaction is developed, but has only to combine and stir the constituents, and for efficiently obtaining the organic-inorganic composite particles, a method of stirring with the use of pH adjustment, heating, catalyst addition, and the like is preferred. Above all, a heating method is more preferred, in that any acid, alkali, catalyst, or the like is not coexistent as a film constituent along with the organic-inorganic composite particles. The heating temperature is preferably 50° C. to 90° C.

Examples of the catalyst include inorganic compounds such as sodium hydroxide, potassium hydroxide, sulfuric acid, nitric acid, and phosphoric acid; and metal complexes such as aluminum tris(ethylacetoacetate), aluminum tris(acetylacetonate), and methylaluminum bis(2,6-di-tert-butyl-4-methylphenoxide), which accelerate the dehydration condensation.

[Constituent: Additive (E)]

Corrosion inhibitors, cross-linkers, antimicrobial/antifungal agents, surfactants, and colorants such as water-soluble or water-dispersible resins and metal compounds may be added to the hydrophilization treatment agent for an aluminum-containing metal material according to the present invention, without departing from the scope of the present invention or impairing film performance.

[Constituent: Liquid Medium]

The liquid medium of the hydrophilization treatment agent for an aluminum-containing metal material according to the present invention is basically water (which is preferably 90 mass % or more on the basis of the mass of the whole liquid medium). However, the liquid medium may contain a water-miscible liquid medium such as alcohol.

[Combination Amounts of Respective Constituents in Hydrophilization Treatment Agent for Aluminum-Containing Metal Material]

(Organic-Inorganic Composite Particle)

The content of the organic-inorganic composite particles in the hydrophilization treatment agent for an aluminum-containing metal material according to the present invention is 40 to 100 mass %, preferably 50 to 100 mass %, and more preferably 60 to 100 mass % on the basis of the total solid content by mass.

(Additive)

The content of the additives in the hydrophilization treatment agent for an aluminum-containing metal material according to the present invention is 0 to 60 mass % on the basis of the mass of the total solid content.

[Use Application of Hydrophilization Treatment Agent for Aluminum-Containing Metal Material]

Next, use applications of the hydrophilization treatment agent for an aluminum-containing metal material according to the present invention will be described. The treatment agent according to the present invention is useful for partial or entire hydrophilization of the surface of the aluminum-containing metal material. The use applications (in other words, a hydrophilization treatment method for an aluminum-containing metal material, a method for producing a hydrophilized aluminum-containing metal material) will be described below.

(Aluminum-Containing Metal Material)

The type of the aluminum-containing metal material to be subjected to hydrophilization according to the present invention is not particularly limited as long as the material contains aluminum, and encompasses aluminum materials, for example, pure aluminum No. 1000 based materials, metal materials plated with aluminum or aluminum alloys, and aluminum-containing alloy materials, for example, aluminum-copper alloys (for example, Al—Cu 2018), aluminum-manganese alloys (for example, Al—Mn 3003), aluminum-magnesium alloys (for example, Al—Mg 5052), and aluminum-magnesium-silicon alloys (for example, Al—Mg—Si 6063).

(Process)

The method of using the hydrophilization treatment agent for an aluminum-containing metal material according to the present invention (in other words, a hydrophilization treatment method for an aluminum-containing metal material, a method for producing a hydrophilized aluminum-containing metal material) includes steps of: bringing the hydrophilization treatment agent into contact with the aluminum-containing metal material; and drying after the contact. The respective steps will be described below in detail.

Contacting Step

The surface of an aluminum-containing metal material or a heat exchanger appropriately subjected to no treatment, or subjected to a cleaning treatment or a rust-proof treatment is partially or entirely treated with the hydrophilization treatment agent such that a required amount of film is obtained. The method of treatment with the hydrophilization treatment agent is not particularly limited, as long as the present hydrophilization treatment agent according to the present invention can be brought into contact with an object to be treated by appropriate means, and examples of the method include, for example, roll coating, spraying, and dipping methods.

Drying Step

The drying after contacting the hydrophilization treatment agent is not to be considered particularly limited as long as water contained in the hydrophilization treatment agent is volatilized, but the drying is achieved through drying by heating or the like. The temperature for the drying by heating is not to be considered particularly limited, but the drying is preferably carried out for 5 seconds to 120 minutes in the range of 80° C. to 250° C., more preferably 100° C. to 200° C.

Other Steps

Further, the aluminum-containing metal material or heat exchanger is preferably cleaned by removing surface contamination with an alkaline or acid cleaner in advance, but when cleaning is not required, the cleaning may be skipped. In addition, if necessary, a rust-proof treatment may be applied before applying the treatment with the hydrophilization treatment agent according to the present invention, without any other treatment or after the cleaning. The rust-proof treatment is not to be considered particularly limited, but examples thereof include known chemical conversion treatments with chromate, zinc phosphate, titanium series, and zirconium series, and corrosion-resistant films such as organic films (chemical conversion films or corrosion-resistant primer films).

[Hydrophilized Aluminum-Containing Metal Material]

The hydrophilized aluminum-containing metal material according to the present invention has a hydrophilic film partially or entirely at the surface of the material. In this regard, the film weight obtained from the hydrophilization treatment agent is not to be considered particularly limited as long as hydrophilicity and an odor property are achieved as objects of the present invention, but preferably 0.1 to 3.0 g/m², more preferably 0.1 to 2.0 g/m². The film amount of 0.1 g/m² or more sufficiently coats the metal material, thereby achieving hydrophilicity or an odor property as objects of the present invention. In addition, the film amount of 3.0 g/m² or less is economic.

[Product with Hydrophilized Aluminum-Containing Metal Material Incorporated Therein]

A preferred example of a product with the hydrophilized aluminum-containing metal material incorporated therein is a heat exchanger. The hydrophilic film according to the present invention has excellent hydrophilicity and odor property. Therefore, when the hydrophilic film is applied to the aluminum-containing metal material constituting a heat exchanger, problems can be solved such as a heat-exchange efficiency decreased and noises due to clogging with dew condensation water. Furthermore, the hydrophilic film according to the present invention can sustain excellent hydrophilicity and odor property even in long-term use.

EXAMPLES

The present invention will be described specifically with reference to examples and comparative examples. It is to be noted that the examples are considered simply by way of example only, but not intended to limit the scope of the present invention to the examples.

<Hydrophilization Treatment Agent>

Tables 1 to 5 show raw materials used for hydrophilization treatment agents according to the examples and comparative examples. In this regard, Table 1 is a list of water-soluble resins (A) for use in the examples and the comparative examples. In addition, Table 2 is a list of poorly water-soluble inorganic oxides (B) for use in the examples and the comparative examples. In addition, Table 3 is a list of organoalkoxysilanes (C) for use in the examples and the comparative examples. In addition, Table 4 is a list of surfactants (D) for use in the examples and the comparative examples. In addition, Table 5 is a list of additives (E) for use in the examples and the comparative examples.

TABLE 1

| Symbol | Material Name | Molecular Weight | Saponification Degree |
|---|---|---|---|
| A1 | Acetoacetyl-Modified Polyvinyl Alcohol | 5000 | 98 mol % |
| A2 | Polyvinyl Alcohol | 10000 | 98 mol % |
| A3 | Polyvinyl Alcohol | 30000 | 98 mol % |
| A4 | Acetoacetyl-Modified Polyvinyl Alcohol | 13000 | 90 mol % |
| A5 | Polyvinyl Alcohol | 22000 | 89 mol % |
| A6 | Chitosan | 9000 | — |
| A7 | Polyethylene Glycol | 5000 | — |
| A8 | Carboxymethyl Cellulose | 40000 | — |
| A9 | Polyethylene Glycol-Modified Polyvinyl Alcohol | 50000 | 98 mol % |
| A10 | Carboxyl-Modified Polyvinyl Alcohol | 80000 | 96 mol % |
| A11 | Polyvinylpyrrolidone-Modified Polyvinyl Alcohol | 55000 | 98 mol % |
| A12 | Cellulose | 100000 | 98 mol % |
| A13 | Water-Soluble Phenolic Resin | 60000 | — |
| A14 | Polyvinyl Alcohol | 140000 | 99 mol % |
| A15 | Hydroxypropyl Methylcellulose | 300000 | — |
| A16 | Polyacrylic Acid | 10000 | — |
| A17 | Polyvinylpyrrolidone | 60000 | — |

TABLE 2

| Symbol | Contained Metal | Material Name | Particle Size | State |
|---|---|---|---|---|
| B1 | Si | Colloidal Silica | 4 nm | Sol State |
| B2 | Si | Colloidal Silica | 50 nm | Sol State |
| B3 | Si | Colloidal Silica | 100 nm | Sol State |
| B4 | Si | Gas-Phase Silica | 200 nm | Powdery Solid |
| B5 | Si | Gas-Phase Silica | 300 nm | Powdery Solid |
| B6 | Ce | Cerium Oxide | 20 nm | Sol State |
| B7 | Ti | Titanium Oxide | 40 nm | Sol State |
| B8 | Sn | Tin Oxide | 10 nm | Sol State |
| B9 | Zr | Zirconium Oxide | 10 nm | Sol State |
| B10 | Al | Aluminum Oxide | 40 nm | Sol State |
| B11 | Zn | Zinc Oxide | 10 nm | Sol State |
| B12 | Fe | Iron Oxide | 30 nm | Sol State |
| B13 | Co | Cobalt Oxide | 40 nm | Sol State |
| B14 | Cu | Copper Oxide | 50 nm | Sol State |
| B15 | Nb | Niobium Oxide | 60 nm | Sol State |

TABLE 3

| Symbol | Material Name |
|---|---|
| C1 | 3-glycidoxypropyltrimethoxysilane |
| C2 | 3-glycidoxypropyldimethoxysilane |
| C3 | 3-glycidoxypropyltriethoxysilane |
| C4 | 3-glycidoxypropyldiethoxysilane |
| C5 | 3-methacryloxypropyltrimethoxysilane |
| C6 | 3-aminopropyltrimethoxysilane |
| C7 | 3-acryloxypropyltrimethoxysilane |
| C8 | 3-mercaptopropylmethyldimethoxysilane |
| C9 | Tetraethoxysilane |

TABLE 4

| Symbol | Material Name | Surface Tension |
|---|---|---|
| D1 | Non-Ionic Surfactant | 30 mN/m |
| D2 | Non-Ionic Surfactant | 15 mN/m |
| D3 | Non-Ionic Surfactant | 45 mN/m |
| D4 | Non-Ionic Surfactant | 55 mN/m |
| D5 | Non-Ionic Surfactant | 65 mN/m |
| D6 | Ampholytic Surfactant | 14 mN/m |
| D7 | Non-Ionic Surfactant | 69 mN/m |
| D8 | Anionic Surfactant | 32 mN/m |
| D9 | Cationic Surfactant | 34 mN/m |

TABLE 5

| Symbol | Type | Material Name | Molecular Weight |
|---|---|---|---|
| E1 | Water-Soluble or Water-Dispersible Resin | Polyacrylic Acid | 20000 |
| E2 | Water-Soluble or Water-Dispersible Resin | Urethane Resin (Anion) | 200000 |
| E3 | Water-Soluble or Water-Dispersible Resin | Urethane Resin (Cation) | 200000 |
| E4 | Water-Soluble or Water-Dispersible Resin | Polyvinylpyrrolidone | 60000 |
| E5 | Water-Soluble or Water-Dispersible Resin | Polyvinyl Alcohol | 140000 |
| E6 | Water-Soluble or Water-Dispersible Resin | Acrylic Resin | 100000 |
| E7 | Water-Soluble or Water-Dispersible Resin | Hydroxypropyl Methylcellulose | 300000 |
| E8 | Water-Soluble or Water-Dispersible Resin | Epoxy Resin | 100000 |
| E9 | Metal Compound | Chromium Sulfate | — |
| E10 | Metal Compound | Chromium Nitrate | — |
| E11 | Metal Compound | Vanadyl Sulfate | — |
| E12 | Metal Compound | Zirconium Acetate | — |
| E13 | Metal Compound | Zirconium Carbonate | — |
| E14 | Cross-Linker | Block Isocyanate | — |
| E15 | Antimicrobial Agent | Antimicrobial Agent (MIT) | — |

The hydrophilization treatment agents for use in the examples and the comparative examples were prepared by stirring after weighing the water-soluble resin (A) having a hydroxyl group, the poorly water-soluble inorganic oxide (B), the organoalkoxysilane (C), the surfactant (D), and the additive (E) with the use of an electronic balance such that the solid contents by weight (g) of the respective raw materials met the compositions in Tables 6 to 9, further combining water such that the total liquid weight was 100 g.

TABLE 6

| Test standard | Type | | | | |
|---|---|---|---|---|---|
| | (A) | (B) | (C) | (D) | (E) |
| Example 1 | A1 | B1 | C1 | D1 | — |
| Example 2 | A1 | B1 | C1 | D2 | — |
| Example 3 | A1 | B1 | C1 | D3 | — |
| Example 4 | A1 | B1 | C1 | D4 | — |
| Example 5 | A1 | B1 | C1 | D5 | — |
| Example 6 | A1 | B1 | C1 | D6 | — |
| Example 7 | A1 | B1 | C1 | D7 | — |
| Example 8 | A1 | B1 | C1 | D8 | — |
| Example 9 | A1 | B1 | C1 | D9 | — |
| Example 10 | A1 | B1 | C1 | D1 | — |
| Example 11 | A1 | B1 | C1 | D1 | — |
| Example 12 | A1 | B1 | C1 | D1 | — |
| Example 13 | A1 | B1 | C1 | D1 | — |
| Example 14 | A1 | B2 | C1 | D1 | — |
| Example 15 | A1 | B2 | C1 | D1 | — |
| Example 16 | A1 | B2 | C1 | D1 | — |
| Example 17 | A1 | B2 | C1 | D1 | — |
| Example 18 | A1 | B2 | C1 | D1 | — |
| Example 19 | A1 | B2 | C1 | D1 | — |
| Example 20 | A1 | B2 | C1 | D1 | — |
| Example 21 | A1 | B2 | C1 | D1 | — |
| Example 22 | A1 | B2 | C1 | D1 | — |
| Example 23 | A1 | B2 | C1 | D1 | — |
| Example 24 | A1 | B2 | C1 | D1 | — |
| Example 25 | A1 | B2 | C1 | D1 | — |
| Example 26 | A1 | B2 | C1 | D1 | — |
| Example 27 | A1 | B2 | C1 | D1 | — |
| Example 28 | A1 | B2 | C1 | D1 | — |
| Example 29 | A1 | B2 | C1 | D1 | — |
| Example 30 | A1 | B1 | C1 | D1 | — |
| Example 31 | A2 | B1 | C1 | D1 | — |
| Example 32 | A3 | B1 | C1 | D1 | — |
| Example 33 | A8 | B1 | C1 | D1 | — |
| Example 34 | A9 | B1 | C1 | D1 | — |
| Example 35 | A12 | B1 | C1 | D1 | — |
| Example 36 | A14 | B1 | C1 | D1 | — |
| Example 37 | A15 | B1 | C1 | D1 | — |
| Example 38 | A5 | B2 | C1 | D1 | — |
| Example 39 | A7 | B2 | C1 | D1 | — |
| Example 40 | A4 | B2 | C1 | D1 | — |
| Example 41 | A6 | B2 | C1 | D1 | — |
| Example 42 | A10 | B2 | C1 | D1 | — |
| Example 43 | A11 | B2 | C1 | D1 | — |
| Example 44 | A13 | B2 | C1 | D1 | — |
| Example 45 | A2 | B6 | C1 | D1 | — |
| Example 46 | A2 | B7 | C1 | D1 | — |
| Example 47 | A2 | B8 | C1 | D1 | — |
| Example 48 | A2 | B9 | C1 | D1 | — |
| Example 49 | A2 | B10 | C1 | D1 | — |
| Example 50 | A2 | B11 | C1 | D1 | — |
| Example 51 | A2 | B12 | C1 | D1 | — |
| Example 52 | A2 | B13 | C1 | D1 | — |

TABLE 7

| Test Standard | Solid Content by Weight | | | | | Combination Ratio | | | Content Ratio of Organic-Inorganic Composite Particles |
|---|---|---|---|---|---|---|---|---|---|
| | (A) | (B) | (C) | (D) | (E) | (C)/{(B) + (D)} | (A)/{(B) + (C) + (D)} | (D)/{(A) + (B) + (C) + (D)} | |
| Example 1 | 3.462 | 8.771 | 2.663 | 0.105 | 0.000 | 0.30 | 0.30 | 0.007 | 100% |
| Example 2 | 3.462 | 8.771 | 2.663 | 0.105 | 0.000 | 0.30 | 0.30 | 0.007 | 100% |
| Example 3 | 3.462 | 8.771 | 2.663 | 0.105 | 0.000 | 0.30 | 0.30 | 0.007 | 100% |
| Example 4 | 3.462 | 8.771 | 2.663 | 0.105 | 0.000 | 0.30 | 0.30 | 0.007 | 100% |
| Example 5 | 3.462 | 8.771 | 2.663 | 0.105 | 0.000 | 0.30 | 0.30 | 0.007 | 100% |
| Example 6 | 3.462 | 8.771 | 2.663 | 0.105 | 0.000 | 0.30 | 0.30 | 0.007 | 100% |
| Example 7 | 3.462 | 8.771 | 2.663 | 0.105 | 0.000 | 0.30 | 0.30 | 0.007 | 100% |
| Example 8 | 3.462 | 8.771 | 2.663 | 0.105 | 0.000 | 0.30 | 0.30 | 0.007 | 100% |
| Example 9 | 3.462 | 8.771 | 2.663 | 0.105 | 0.000 | 0.30 | 0.30 | 0.007 | 100% |
| Example 10 | 3.462 | 8.861 | 2.663 | 0.015 | 0.000 | 0.30 | 0.30 | 0.001 | 100% |
| Example 11 | 3.462 | 8.726 | 2.663 | 0.150 | 0.000 | 0.30 | 0.30 | 0.010 | 100% |
| Example 12 | 3.462 | 8.426 | 2.663 | 0.450 | 0.000 | 0.30 | 0.30 | 0.030 | 100% |
| Example 13 | 3.462 | 8.874 | 2.663 | 0.002 | 0.000 | 0.30 | 0.30 | 0.0001 | 100% |
| Example 14 | 1.364 | 13.548 | 0.014 | 0.075 | 0.000 | 0.001 | 0.10 | 0.005 | 100% |
| Example 15 | 7.500 | 7.418 | 0.007 | 0.075 | 0.000 | 0.001 | 1.00 | 0.005 | 100% |
| Example 16 | 10.714 | 4.206 | 0.004 | 0.075 | 0.000 | 0.001 | 2.50 | 0.005 | 100% |
| Example 17 | 12.500 | 2.423 | 0.002 | 0.075 | 0.000 | 0.001 | 5.00 | 0.005 | 100% |
| Example 18 | 1.364 | 13.426 | 0.135 | 0.075 | 0.000 | 0.01 | 0.10 | 0.005 | 100% |
| Example 19 | 7.500 | 7.351 | 0.074 | 0.075 | 0.000 | 0.01 | 1.00 | 0.005 | 100% |
| Example 20 | 10.714 | 4.168 | 0.042 | 0.075 | 0.000 | 0.01 | 2.50 | 0.005 | 100% |
| Example 21 | 12.500 | 2.400 | 0.025 | 0.075 | 0.000 | 0.01 | 5.00 | 0.005 | 100% |
| Example 22 | 1.364 | 6.743 | 6.818 | 0.075 | 0.000 | 1.00 | 0.10 | 0.005 | 100% |
| Example 23 | 7.500 | 3.675 | 3.750 | 0.075 | 0.000 | 1.00 | 1.00 | 0.005 | 100% |
| Example 24 | 10.714 | 2.068 | 2.143 | 0.075 | 0.000 | 1.00 | 2.50 | 0.005 | 100% |
| Example 25 | 12.500 | 1.175 | 1.250 | 0.075 | 0.000 | 1.00 | 5.00 | 0.005 | 100% |
| Example 26 | 1.364 | 9.016 | 4.545 | 0.075 | 0.000 | 0.50 | 0.10 | 0.005 | 100% |
| Example 27 | 7.500 | 4.925 | 2.500 | 0.075 | 0.000 | 0.50 | 1.00 | 0.005 | 100% |
| Example 28 | 10.714 | 2.782 | 1.429 | 0.075 | 0.000 | 0.50 | 2.50 | 0.005 | 100% |
| Example 29 | 12.500 | 1.592 | 0.833 | 0.075 | 0.000 | 0.50 | 5.00 | 0.005 | 100% |
| Example 30 | 5.000 | 8.258 | 1.667 | 0.075 | 0.000 | 0.20 | 0.50 | 0.005 | 100% |
| Example 31 | 3.462 | 9.540 | 1.923 | 0.075 | 0.000 | 0.20 | 0.30 | 0.005 | 100% |
| Example 32 | 3.462 | 9.540 | 1.923 | 0.075 | 0.000 | 0.20 | 0.30 | 0.005 | 100% |
| Example 33 | 3.462 | 9.540 | 1.923 | 0.075 | 0.000 | 0.20 | 0.30 | 0.005 | 100% |
| Example 34 | 3.462 | 9.540 | 1.923 | 0.075 | 0.000 | 0.20 | 0.30 | 0.005 | 100% |
| Example 35 | 3.462 | 9.540 | 1.923 | 0.075 | 0.000 | 0.20 | 0.30 | 0.005 | 100% |
| Example 36 | 3.462 | 9.540 | 1.923 | 0.075 | 0.000 | 0.20 | 0.30 | 0.005 | 100% |
| Example 37 | 3.462 | 9.540 | 1.923 | 0.075 | 0.000 | 0.20 | 0.30 | 0.005 | 100% |
| Example 38 | 3.462 | 9.540 | 1.923 | 0.075 | 0.000 | 0.20 | 0.30 | 0.005 | 100% |
| Example 39 | 6.176 | 6.984 | 1.765 | 0.075 | 0.000 | 0.25 | 0.70 | 0.005 | 100% |
| Example 40 | 6.176 | 6.984 | 1.765 | 0.075 | 0.000 | 0.25 | 0.70 | 0.005 | 100% |
| Example 41 | 6.176 | 6.984 | 1.765 | 0.075 | 0.000 | 0.25 | 0.70 | 0.005 | 100% |
| Example 42 | 6.176 | 6.984 | 1.765 | 0.075 | 0.000 | 0.25 | 0.70 | 0.005 | 100% |
| Example 43 | 6.176 | 6.984 | 1.765 | 0.075 | 0.000 | 0.25 | 0.70 | 0.005 | 100% |
| Example 44 | 6.176 | 6.984 | 1.765 | 0.075 | 0.000 | 0.25 | 0.70 | 0.005 | 100% |
| Example 45 | 6.176 | 6.984 | 1.765 | 0.075 | 0.000 | 0.25 | 0.70 | 0.005 | 100% |
| Example 46 | 6.176 | 6.984 | 1.765 | 0.075 | 0.000 | 0.25 | 0.70 | 0.005 | 100% |
| Example 47 | 6.176 | 6.984 | 1.765 | 0.075 | 0.000 | 0.25 | 0.70 | 0.005 | 100% |
| Example 48 | 6.176 | 6.984 | 1.765 | 0.075 | 0.000 | 0.25 | 0.70 | 0.005 | 100% |
| Example 49 | 6.176 | 6.984 | 1.765 | 0.075 | 0.000 | 0.25 | 0.70 | 0.005 | 100% |
| Example 50 | 6.176 | 6.984 | 1.765 | 0.075 | 0.000 | 0.25 | 0.70 | 0.005 | 100% |
| Example 51 | 6.176 | 6.984 | 1.765 | 0.075 | 0.000 | 0.25 | 0.70 | 0.005 | 100% |
| Example 52 | 6.176 | 6.984 | 1.765 | 0.075 | 0.000 | 0.25 | 0.70 | 0.005 | 100% |

TABLE 8

| Test Standard | Type | | | | |
|---|---|---|---|---|---|
| | (A) | (B) | (C) | (D) | (E) |
| Example 53 | A2 | B14 | C1 | D1 | — |
| Example 54 | A2 | B15 | C1 | D1 | — |
| Example 55 | A2 | B1 | C1 | D1 | — |
| Example 56 | A2 | B2 | C1 | D1 | — |
| Example 57 | A2 | B3 | C1 | D1 | — |
| Example 58 | A2 | B4 | C1 | D1 | — |
| Example 59 | A2 | B5 | C1 | D1 | — |
| Example 60 | A1 | B2 | C2 | D1 | — |
| Example 61 | A1 | B2 | C3 | D1 | — |
| Example 62 | A1 | B2 | C4 | D1 | — |
| Example 63 | A1 | B2 | C5 | D1 | — |
| Example 64 | A1 | B2 | C6 | D1 | — |
| Example 65 | A1 | B2 | C7 | D1 | — |
| Example 66 | A1 | B2 | C8 | D1 | — |
| Example 67 | A1 | B2 | C9 | D1 | — |
| Example 68 | A1 | B1 | C1 | D1 | E1 |
| Example 69 | A1 | B1 | C1 | D1 | E1 |
| Example 70 | A1 | B1 | C1 | D1 | E1 |
| Example 71 | A1 | B1 | C1 | D1 | E1 |
| Example 72 | A1 | B1 | C1 | D1 | E1 |
| Example 73 | A1 | B1 | C1 | D1 | E1 |
| Example 74 | A1 | B1 | C1 | D1 | E2 |

TABLE 8-continued

| Test Standard | Type | | | | |
|---|---|---|---|---|---|
| | (A) | (B) | (C) | (D) | (E) |
| Example 75 | A1 | B1 | C1 | D1 | E3 |
| Example 76 | A1 | B1 | C1 | D1 | E4 |
| Example 77 | A1 | B1 | C1 | D1 | E5 |
| Example 78 | A1 | B1 | C1 | D1 | E6 |
| Example 79 | A1 | B1 | C1 | D1 | E7 |
| Example 80 | A1 | B1 | C1 | D1 | E8 |
| Example 81 | A1 | B1 | C1 | D1 | E9 |
| Example 82 | A1 | B1 | C1 | D1 | E10 |
| Example 83 | A1 | B1 | C1 | D1 | E11 |
| Example 84 | A1 | B1 | C1 | D1 | E12 |
| Example 85 | A1 | B1 | C1 | D1 | E13 |
| Example 86 | A1 | B1 | C1 | D1 | E14 |
| Example 87 | A1 | B1 | C1 | D1 | E15 |
| Comparative Example 1 | A1 | — | — | — | — |
| Comparative Example 2 | — | B1 | — | — | — |
| Comparative Example 3 | — | — | C1 | — | — |
| Comparative Example 4 | A1 | B1 | — | — | — |
| Comparative Example 5 | A1 | — | C1 | — | — |
| Comparative Example 6 | — | B1 | C1 | — | — |
| Comparative Example 7 | — | B1 | C1 | — | — |
| Comparative Examrde 8 | A1 | B1 | C1 | — | — |
| Comparative Examaple 9 | A1 | B1 | C1 | D1 | — |
| Comparative Example 10 | A1 | B1 | C1 | D1 | — |
| Comparative Example 11 | A1 | B1 | C1 | D1 | — |
| Comparative Example 12 | A16 | B1 | C1 | D1 | — |
| Comparative Example 13 | A17 | B1 | C1 | D1 | — |
| Comparative Example 14 | A1 | B1 | C1 | D1 | E1 |
| Comparative Example 15 | A1 | B1 | C1 | — | — |

TABLE 9

| Test Standard | Solid Content by Weight | | | | | Combination Ratio | | | Content Ratio of Organic-Inorganic Composite Particles |
|---|---|---|---|---|---|---|---|---|---|
| | (A) | (B) | (C) | (D) | (E) | (C)/{(B) + (D)} | (A/{(B) + (C) + (D)} | (D)/{(A) + (B) + (C) + (D)} | |
| Example 53 | 6.176 | 6.984 | 1.765 | 0.075 | 0.000 | 0.25 | 0.70 | 0.005 | 100% |
| Example 54 | 6.176 | 6.984 | 1.765 | 0.075 | 0.000 | 0.25 | 0.70 | 0.005 | 100% |
| Example 55 | 5.000 | 7.925 | 2.000 | 0.075 | 0.000 | 0.25 | 0.50 | 0.005 | 100% |
| Example 56 | 5.000 | 7.925 | 2.000 | 0.075 | 0.000 | 0.25 | 0.50 | 0.005 | 100% |
| Example 57 | 5.000 | 7.925 | 2.000 | 0.075 | 0.000 | 0.25 | 0.50 | 0.005 | 100% |
| Example 58 | 5.000 | 7.925 | 2.000 | 0.075 | 0.000 | 0.25 | 0.50 | 0.005 | 100% |
| Example 59 | 5.000 | 7.925 | 2.000 | 0.075 | 0.000 | 0.25 | 0.50 | 0.005 | 100% |
| Example 60 | 6.176 | 6.984 | 1.765 | 0.075 | 0.000 | 0.25 | 0.70 | 0.005 | 100% |
| Example 61 | 6.176 | 6.984 | 1.765 | 0.075 | 0.000 | 0.25 | 0.70 | 0.005 | 100% |
| Example 62 | 6.176 | 6.984 | 1.765 | 0.075 | 0.000 | 0.25 | 0.70 | 0.005 | 100% |
| Example 63 | 6.176 | 6.984 | 1.765 | 0.075 | 0.000 | 0.25 | 0.70 | 0.005 | 100% |
| Example 64 | 6.176 | 6.984 | 1.765 | 0.075 | 0.000 | 0.25 | 0.70 | 0.005 | 100% |
| Example 65 | 6.176 | 6.984 | 1.765 | 0.075 | 0.000 | 0.25 | 0.70 | 0.005 | 100% |
| Example 66 | 6.176 | 6.984 | 1.765 | 0.075 | 0.000 | 0.25 | 0.70 | 0.005 | 100% |
| Example 67 | 6.176 | 6.984 | 1.765 | 0.075 | 0.000 | 0.25 | 0.70 | 0.005 | 100% |
| Example 68 | 1.385 | 3.508 | 1.065 | 0.042 | 9.000 | 0.30 | 0.30 | 0.007 | 40% |
| Example 69 | 1.558 | 3.947 | 1.198 | 0.047 | 8.250 | 0.30 | 0.30 | 0.007 | 45% |
| Example 70 | 1.731 | 4.385 | 1.331 | 0.053 | 7.500 | 0.30 | 0.30 | 0.007 | 50% |
| Example 71 | 1.904 | 4.824 | 1.464 | 0.058 | 6.750 | 0.30 | 0.30 | 0.007 | 55% |
| Example 72 | 2.077 | 5.262 | 1.598 | 0.063 | 6.000 | 0.30 | 0.30 | 0.007 | 60% |
| Example 73 | 2.769 | 7.017 | 2.130 | 0.084 | 3.000 | 0.30 | 0.30 | 0.007 | 80% |
| Example 74 | 2.769 | 7.017 | 2.130 | 0.084 | 3.000 | 0.30 | 0.30 | 0.007 | 80% |
| Example 75 | 2.769 | 7.017 | 2.130 | 0.084 | 3.000 | 0.30 | 0.30 | 0.007 | 80% |
| Example 76 | 2.769 | 7.017 | 2.130 | 0.084 | 3.000 | 0.30 | 0.30 | 0.007 | 80% |
| Example 77 | 2.769 | 7.017 | 2.130 | 0.084 | 3.000 | 0.30 | 0.30 | 0.007 | 80% |
| Example 78 | 2.769 | 7.017 | 2.130 | 0.084 | 3.000 | 0.30 | 0.30 | 0.007 | 80% |
| Example 79 | 2.769 | 7.017 | 2.130 | 0.084 | 3.000 | 0.30 | 0.30 | 0.007 | 80% |
| Example 80 | 2.769 | 7.017 | 2.130 | 0.084 | 3.000 | 0.30 | 0.30 | 0.007 | 80% |
| Example 81 | 2.769 | 7.017 | 2.130 | 0.084 | 3.000 | 0.30 | 0.30 | 0.007 | 80% |
| Example 82 | 2.769 | 7.017 | 2.130 | 0.084 | 3.000 | 0.30 | 0.30 | 0.007 | 80% |
| Example 83 | 2.769 | 7.017 | 2.130 | 0.084 | 3.000 | 0.30 | 0.30 | 0.007 | 80% |
| Example 84 | 2.769 | 7.017 | 2.130 | 0.084 | 3.000 | 0.30 | 0.30 | 0.007 | 80% |
| Example 85 | 3.115 | 7.894 | 2.396 | 0.095 | 1.500 | 0.30 | 0.30 | 0.007 | 90% |
| Example 86 | 3.115 | 7.894 | 2.396 | 0.095 | 1.500 | 0.30 | 0.30 | 0.007 | 90% |
| Example 87 | 3.115 | 7.894 | 2.396 | 0.095 | 1.500 | 0.30 | 0.30 | 0.007 | 90% |
| Comparative Example 1 | 15.000 | 0.000 | 0.000 | 0.000 | 0.000 | — | — | — | — |
| Comparative Example 2 | 0.000 | 15.000 | 0.000 | 0.000 | 0.000 | — | — | — | — |
| Comparative Example 3 | 0.000 | 0.000 | 15.000 | 0.000 | 0.000 | — | — | — | — |
| Comparative Example 4 | 7.500 | 7.500 | 0.000 | 0.000 | 0.000 | — | 1.00 | — | — |
| Comparative Example 5 | 7.500 | 0.000 | 7.500 | 0.000 | 0.000 | — | 1.00 | — | — |
| Comparative Example 6 | 0.000 | 10.000 | 5.000 | 0.000 | 0.000 | 0.50 | — | — | — |
| Comparative Example 7 | 0.000 | 3.000 | 12.000 | 0.000 | 0.000 | 4.00 | — | — | — |

TABLE 9-continued

| Test Standard | Solid Content by Weight (A) | (B) | (C) | (D) | (E) | (C)/{(B) + (D)} | (A/{(B) + (C) + (D)} | (D)/{(A) + (B) + (C) + (D)} | Content Ratio of Organic-Inorganic Composite Particles |
|---|---|---|---|---|---|---|---|---|---|
| Comparative Example 8 | 0.714 | 11.354 | 2.857 | 0.075 | 0.000 | 0.25 | 0.05 | 0.005 | 100% |
| Comparative Example 9 | 12.541 | 2.360 | 0.024 | 0.075 | 0.000 | 0.01 | 5.10 | 0.005 | 100% |
| Comparative Example 10 | 6.176 | 8.741 | 0.007 | 0.075 | 0.000 | 0.0008 | 0.70 | 0.005 | 100% |
| Comparative Example 11 | 6.176 | 4.127 | 4.622 | 0.075 | 0.000 | 1.10 | 0.70 | 0.005 | 100% |
| Comparative Example 12 | 6.176 | 6.984 | 1.765 | 0.075 | 0.000 | 0.25 | 0.70 | 0.005 | 100% |
| Comparative Example 13 | 6.176 | 6.984 | 1.765 | 0.075 | 0.000 | 0.25 | 0.70 | 0.005 | 100% |
| Comparative Example 14 | 1.212 | 3.080 | 0.932 | 0.026 | 9.750 | 0.30 | 0.300 | 0.005 | 35% |
| Comparative Example 15 | 0.714 | 11.429 | 2.857 | 0.000 | 0.000 | 0.25 | 0.050 | — | — |

<Test Material>

Used were test pieces made of aluminum (A1050 from Paltec Test Panels Co., Ltd., dimensions: 70 mm×150 mm, plate thickness: 0.8 mm).

<Method for Cleaning Test Material>

The test materials were subjected to an immersion treatment for 3 minutes in a treatment bath adjusted to a bath temperature 60° C. with an alkaline degreasing agent "FINECLEANER 315" (from Nihon Parkerizing Co., Ltd.) adjusted to an agent concentration of 20 g/L, for removing dust and oil adhering to the surface, and the alkali remaining at the surface was then cleaned with tap water.

<Hydrophilization Treatment Method>

The cleaned test materials were immersed respectively in the hydrophilization treatment agents shown in Tables 6 to 9, and then dried by heating for 6 minutes with the materials hung in a blast drier adjusted to any temperature, and adopted as evaluation samples for use in the following evaluation tests.

<Hydrophilicity Evaluation Method>

Deionized water was delivered by 2 μl drops onto the evaluation samples, and the contact angles of water droplets formed were measured with a contact angle meter (DM-501 from Kyowa Interface Science Co., Ltd.). The contact angle of the evaluation sample cooled down to room temperature after the hydrophilic treatment was regarded as initial hydrophilicity, and the contact angle obtained after the evaluation sample was immersed for 600 hours in deionized water, then dried for 1 hour in a blast drier adjusted to 50° C., and cooled down to room temperature was regarded as durable hydrophilicity. The obtained contact angles were rated in accordance with the following criteria, and the contact angles rated as 3 points or more were regarded as passing hydrophilicity as an object of the present invention.

<Rating Criteria for Hydrophilicity>

5 points: less than 10°
4 points: 10° or more and less than 20°
3 points: 20° or more and less than 30°
2 points: 30° or more and less than 40°
1 point: 40° or more <Odor Property Evaluation Method>

The odor of the evaluation sample just cooled down to room temperature after the test sample was subjected to the hydrophilic treatment was regarded as an initial odor, and the odor obtained after the evaluation sample was immersed for 600 hours in deionized water, then dried for 1 hour in a blast drier adjusted to 50° C., and cooled down to room temperature was regarded as durable odor. The obtained odors were rated in accordance with the following criteria, and the odors rated as 3 points or more were regarded as passing odor properties as an object of the present invention.

<Rating Criteria for Odor Property>

5 points: smelling almost no odor
4 points: smelling a slight odor
3 points: smelling a clear odor
2 points: smelling a strong odor
1 point: smelling a very strong odor <Durability Evaluation Method>

The weight of the evaluation sample immersed for 600 hours in deionized water, then dried for 1 hour in a blast drier adjusted to 50° C. and cooled down to room temperature was measured, and the film residual ratio was figured out for each sample from the formula 1, and rated in accordance with the following rating.

Film Residual Ratio (%)=[Evaluation Sample Weight (g) after Durability Test–Test Material Weight (g) before Hydrophilization Treatment]÷[Test Material Weight (g) after Hydrophilization Treatment–Test Material Weight (g) before Hydrophilization Treatment]×100    [Formula 1]

The obtained film residual ratios were rated in accordance with the following criteria, and the film residual ratios rated as 3 or more were regarded as passing durability as an object of the present invention.

<Rating Criteria for Durability>

5 points: 90% or more
4 points: 80% or more and less than 90%
3 points: 70% or more and less than 80%
2 points: 50% or more and less than 70%
1 point: less than 50%

<Evaluation of Frost Formation Resistance>

The evaluation samples were immersed for 100 hours in deionized water, then dried for 1 hour in a blast drier adjusted to 50° C., cooled down to room temperature, and used for evaluation. The evaluation samples were attached to a cooling plate installed vertically in a constant-temperature and humidity zone at a relative humidity of 80% in an atmosphere at 2° C., cooled for 30 minutes at −10° C., and left for 10 minutes after stop the cooling. Thereafter, cooling was carried out for 15 minutes under the conductions mentioned previously, and the frost generation areas after 15 minutes were observed visually. The ratios of the generated frosts to the surface areas of the evaluation samples (generation area ratios) were rated in accordance with the following criteria, and the ratios rated as 3 or more were regarded as passing frost formation resistance as an object of the present invention.

<Rating Criteria for Frost Formation Resistance>
5 points: frost generation area ratio of less than 20%
4 points: frost generation area ratio of 20% to less than 40%
3 points: frost generation area ratio of 40% or more and less than 60%
2 points: frost generation area ratio of 60% or more and less than 80%
1 point: frost generation area ratio of 80% or more
<Dispersion Stability Evaluation Method>

The hydrophilization treatment agents were stored in a thermostatic chamber at 40° C. for 1 week, and the liquid appearances after the storage were confirmed visually, and rated as follows. It is to be noted that the dispersion stability was regarded as passing dispersion stability as long as the other performance evaluation results were regarded as passing results in use after well stirring for dispersion, even with precipitate generation.

<Rating Criteria for Dispersion Stability>
5 points: no precipitate
3 points: a minute amount of precipitate generated at the bottom of the container
1 point: a large amount of precipitate generated at the bottom of the container <Comprehensive Evaluation>

Based on the evaluations mentioned above, the hydrophilization treatment agents provided in the examples and the comparative examples were subjected to a comprehensive evaluation. As for the comprehensive evaluation, scores were provided by "Score of Comprehensive Evaluation={Score of Hydrophilicity (Initial)}+{Score of Hydrophilicity (Durable)}×2+{Score of Odor Property (Initial)}+{Score of Odor Property (Durable)}×2+(Score of Durability)+(Score of Frost Formation Resistance)×2+(Score of Dispersion Stability)".

Tables 10 and 11 show evaluation results of the hydrophilization treatment agents provided in the examples and the comparative examples.

TABLE 10

| Example | Hydrophilicity Initial | Hydrophilicity Durable | Odor Property Initial | Odor Property Durable | Durability | Frost Formation Resistance | Dispersion Stability | Total Score |
|---|---|---|---|---|---|---|---|---|
| Example 1 | 5 | 5 | 5 | 5 | 5 | 5 | 5 | 50 |
| Example 2 | 5 | 5 | 5 | 5 | 5 | 5 | 5 | 50 |
| Example 3 | 5 | 5 | 5 | 5 | 5 | 5 | 5 | 50 |
| Example 4 | 5 | 4 | 5 | 5 | 5 | 5 | 5 | 48 |
| Example 5 | 5 | 4 | 5 | 5 | 5 | 4 | 5 | 46 |
| Example 6 | 4 | 3 | 5 | 4 | 5 | 3 | 5 | 39 |
| Example 7 | 4 | 4 | 4 | 4 | 4 | 3 | 3 | 37 |
| Example 8 | 4 | 4 | 5 | 4 | 5 | 4 | 5 | 43 |
| Example 9 | 4 | 4 | 5 | 4 | 5 | 4 | 5 | 43 |
| Example 10 | 5 | 5 | 5 | 5 | 5 | 5 | 5 | 50 |
| Example 11 | 5 | 5 | 5 | 5 | 5 | 5 | 5 | 50 |
| Example 12 | 5 | 4 | 5 | 4 | 4 | 4 | 5 | 43 |
| Example 13 | 4 | 4 | 5 | 4 | 4 | 4 | 5 | 42 |
| Example 14 | 4 | 4 | 4 | 3 | 3 | 5 | 5 | 40 |
| Example 15 | 4 | 4 | 4 | 3 | 3 | 5 | 5 | 40 |
| Example 16 | 3 | 3 | 4 | 3 | 3 | 3 | 5 | 33 |
| Example 17 | 3 | 3 | 5 | 3 | 3 | 3 | 5 | 34 |
| Example 18 | 5 | 5 | 5 | 5 | 5 | 5 | 5 | 50 |
| Example 19 | 5 | 5 | 5 | 5 | 5 | 5 | 5 | 50 |
| Example 20 | 4 | 4 | 5 | 4 | 3 | 3 | 5 | 39 |
| Example 21 | 4 | 3 | 5 | 4 | 3 | 3 | 5 | 37 |
| Example 22 | 4 | 4 | 4 | 4 | 5 | 4 | 5 | 42 |
| Example 23 | 4 | 4 | 5 | 4 | 5 | 4 | 5 | 43 |
| Example 24 | 3 | 3 | 5 | 4 | 3 | 3 | 5 | 36 |
| Example 25 | 3 | 3 | 4 | 4 | 3 | 3 | 5 | 35 |
| Example 26 | 5 | 5 | 5 | 5 | 5 | 5 | 5 | 50 |
| Example 27 | 5 | 5 | 5 | 5 | 5 | 5 | 5 | 50 |
| Example 28 | 5 | 4 | 5 | 4 | 4 | 4 | 5 | 43 |
| Example 29 | 4 | 3 | 4 | 4 | 4 | 3 | 5 | 37 |
| Example 30 | 5 | 5 | 5 | 5 | 5 | 5 | 5 | 50 |
| Example 31 | 5 | 5 | 5 | 5 | 5 | 5 | 5 | 50 |
| Example 32 | 5 | 5 | 5 | 5 | 5 | 5 | 5 | 50 |
| Example 33 | 4 | 4 | 5 | 3 | 3 | 3 | 5 | 37 |
| Example 34 | 4 | 4 | 5 | 5 | 5 | 5 | 5 | 47 |
| Example 35 | 4 | 3 | 4 | 3 | 3 | 4 | 5 | 36 |
| Example 36 | 3 | 3 | 3 | 3 | 4 | 3 | 5 | 33 |
| Example 37 | 3 | 3 | 3 | 3 | 3 | 3 | 5 | 32 |
| Example 38 | 5 | 4 | 5 | 4 | 4 | 5 | 5 | 45 |
| Example 39 | 5 | 4 | 5 | 4 | 4 | 5 | 5 | 45 |
| Example 40 | 5 | 5 | 5 | 5 | 5 | 5 | 5 | 50 |
| Example 41 | 5 | 4 | 5 | 4 | 4 | 5 | 5 | 45 |
| Example 42 | 4 | 4 | 4 | 4 | 4 | 4 | 5 | 41 |
| Example 43 | 4 | 4 | 4 | 4 | 4 | 4 | 5 | 41 |
| Example 44 | 4 | 3 | 3 | 4 | 4 | 3 | 5 | 36 |

TABLE 10-continued

| Example | Hydrophilicity Initial | Hydrophilicity Durable | Odor Property Initial | Odor Property Durable | Durability | Frost Formation Resistance | Dispersion Stability | Total Score |
|---|---|---|---|---|---|---|---|---|
| Example 45 | 4 | 4 | 4 | 4 | 4 | 4 | 3 | 39 |
| Example 46 | 4 | 4 | 4 | 4 | 4 | 4 | 3 | 39 |
| Example 47 | 5 | 4 | 4 | 3 | 4 | 4 | 5 | 40 |
| Example 48 | 5 | 4 | 4 | 3 | 4 | 4 | 5 | 40 |
| Example 49 | 5 | 4 | 5 | 3 | 4 | 4 | 5 | 41 |
| Example 50 | 5 | 4 | 4 | 4 | 4 | 4 | 3 | 40 |
| Example 51 | 4 | 3 | 4 | 3 | 3 | 3 | 3 | 32 |
| Example 52 | 4 | 3 | 4 | 3 | 3 | 4 | 3 | 34 |

TABLE 11

| Example | Hydrophilicity Initial | Hydrophilicity Durable | Odor Property Initial | Odor Property Durable | Durability | Frost Formation Resistance | Dispersion Stability | Total Score |
|---|---|---|---|---|---|---|---|---|
| Example 53 | 4 | 3 | 4 | 3 | 3 | 3 | 3 | 32 |
| Example 54 | 4 | 3 | 4 | 3 | 3 | 4 | 3 | 34 |
| Example 55 | 5 | 5 | 5 | 5 | 5 | 5 | 5 | 50 |
| Example 56 | 5 | 5 | 5 | 5 | 5 | 5 | 5 | 50 |
| Example 57 | 5 | 5 | 5 | 5 | 5 | 5 | 5 | 50 |
| Example 58 | 5 | 4 | 5 | 5 | 5 | 5 | 3 | 46 |
| Example 59 | 4 | 3 | 5 | 5 | 5 | 5 | 1 | 41 |
| Example 60 | 5 | 5 | 5 | 5 | 5 | 5 | 5 | 50 |
| Example 61 | 5 | 5 | 5 | 5 | 5 | 5 | 5 | 50 |
| Example 62 | 5 | 5 | 5 | 5 | 5 | 5 | 5 | 50 |
| Example 63 | 4 | 3 | 4 | 3 | 4 | 4 | 5 | 37 |
| Example 64 | 4 | 3 | 4 | 3 | 3 | 4 | 5 | 36 |
| Example 65 | 4 | 3 | 4 | 3 | 4 | 4 | 5 | 37 |
| Example 66 | 4 | 3 | 4 | 3 | 4 | 4 | 5 | 37 |
| Example 67 | 4 | 3 | 4 | 3 | 5 | 4 | 5 | 38 |
| Example 68 | 3 | 3 | 4 | 3 | 4 | 3 | 5 | 34 |
| Example 69 | 4 | 3 | 4 | 4 | 4 | 4 | 5 | 39 |
| Example 70 | 5 | 4 | 5 | 5 | 5 | 4 | 5 | 46 |
| Example 71 | 5 | 4 | 5 | 5 | 5 | 4 | 5 | 46 |
| Example 72 | 5 | 5 | 5 | 5 | 5 | 5 | 5 | 50 |
| Example 73 | 5 | 5 | 5 | 5 | 5 | 5 | 5 | 50 |
| Example 74 | 5 | 5 | 5 | 5 | 5 | 5 | 5 | 50 |
| Example 75 | 5 | 5 | 5 | 5 | 5 | 5 | 5 | 50 |
| Example 76 | 5 | 5 | 5 | 5 | 5 | 5 | 5 | 50 |
| Example 77 | 5 | 5 | 5 | 5 | 5 | 5 | 5 | 50 |
| Example 78 | 5 | 5 | 5 | 5 | 5 | 5 | 5 | 50 |
| Example 79 | 5 | 5 | 5 | 5 | 5 | 5 | 5 | 50 |
| Example 80 | 5 | 5 | 5 | 5 | 5 | 5 | 5 | 50 |
| Example 81 | 5 | 5 | 5 | 5 | 5 | 5 | 5 | 50 |
| Example 82 | 5 | 5 | 5 | 5 | 5 | 5 | 5 | 50 |
| Example 83 | 5 | 5 | 5 | 5 | 5 | 5 | 5 | 50 |
| Example 84 | 5 | 5 | 5 | 5 | 5 | 5 | 5 | 50 |
| Example 85 | 5 | 5 | 5 | 5 | 5 | 5 | 5 | 50 |
| Example 86 | 5 | 5 | 5 | 5 | 5 | 5 | 5 | 50 |
| Example 87 | 5 | 5 | 5 | 5 | 5 | 5 | 5 | 50 |
| Comparative Example 1 | 2 | 2 | 4 | 3 | 2 | 2 | 5 | 27 |
| Comparative Example 2 | 5 | 5 | 1 | 1 | 2 | 4 | 5 | 33 |
| Comparative Example 3 | 1 | 1 | 2 | 1 | 1 | 1 | 5 | 15 |
| Comparative Example 4 | 3 | 2 | 3 | 2 | 2 | 2 | 5 | 25 |
| Comparative Example 5 | 1 | 1 | 1 | 1 | 4 | 2 | 5 | 19 |
| Comparative Example 6 | 2 | 2 | 1 | 1 | 3 | 2 | 5 | 21 |
| Comparative Example 7 | 1 | 1 | 1 | 1 | 3 | 2 | 5 | 18 |
| Comparative Example 8 | 2 | 3 | 2 | 1 | 2 | 3 | 5 | 25 |
| Comparative Example 9 | 2 | 2 | 3 | 3 | 2 | 1 | 5 | 24 |
| Comparative Example 10 | 3 | 3 | 2 | 2 | 3 | 2 | 5 | 27 |

TABLE 11-continued

| Example | Hydrophilicity Initial | Durable | Odor Property Initial | Durable | Durability | Frost Formation Resistance | Dispersion Stability | Total Score |
|---|---|---|---|---|---|---|---|---|
| Comparative Example 11 | 3 | 2 | 3 | 2 | 4 | 2 | 5 | 27 |
| Comparative Example 12 | 4 | 1 | 3 | 2 | 1 | 1 | 5 | 21 |
| Comparative Example 13 | 4 | 1 | 3 | 1 | 1 | 1 | 5 | 19 |
| Comparative Example 14 | 2 | 1 | 4 | 4 | 4 | 1 | 5 | 27 |
| Comparative Example 15 | 3 | 2 | 3 | 2 | 2 | 2 | 5 | 25 |

As just described, it is obvious that aluminum-containing metal materials treated with the hydrophilization treatment agent for aluminum-containing metal materials according to the present invention, heat exchangers with the materials incorporated therein, and further, heat exchangers treated with the hydrophilization treatment agent according to the present invention have excellent hydrophilicity and odor properties, and durability thereof.

The invention claimed is:

1. A hydrophilization treatment agent for an aluminum-containing metal material, the hydrophilization treatment agent containing:
   organic-inorganic composite particles obtained by combining one or more selected from water-soluble resins (A) having a hydroxyl group, one or more selected from poorly water-soluble inorganic oxides (B), one or more selected from organoalkoxysilanes (C), and a surfactant (D) such that (C)/{(B)+(D)} and (A)/{(B)+(C)+(D)} are respectively 0.001 to 1.0 and 0.1 to 5.0 in solid content ratio by weight; and
   water,
   wherein the organic-inorganic composite particles are 40 to 100 mass % based on total solid content by mass,
   wherein the surfactant (D) is at least one selected from the group consisting of a non-ionic surfactant, an anionic surfactant, a cationic surfactant, and an ampholytic surfactant,
   wherein the non-ionic surfactant is at least one selected from the group consisting of: polyoxyethylenealkylethers; polyoxyethylene octylphenyl ethers; polyoxyethylene alkyl allyl ethers; polyoxyethylene derivatives; oxyethylene-oxypropylene block copolymers: sorbitan fatty acid esters; glycerin fatty acid esters; polyoxyethylene fatty acid esters; and fluorochemical surfactants,
   wherein the anionic surfactant is at least one selected from the group consisting of: fatty acid salts; alkyl sulfate esters; alkylbenzene sulfonates; alkylnaphthalene sulfonates; alkyl diphenyl ether disulfonates; alkylphosphates; polyoxyethylene alkyl sulfate esters; and fluorochemical surfactants,
   wherein the cationic surfactant is at least one selected from the group consisting of: alkylamine salts; quaternary ammonium salts; alkyl betaines; amine oxides; and fluorochemical surfactants, and
   wherein the ampholytic surfactant is at least one selected from the group consisting of imidazoline ampholytic surfactants, glycine ampholytic surfactants, and amine oxide ampholytic surfactants.

2. The hydrophilization treatment agent according to claim 1, wherein the water-soluble resins (A) having a hydroxyl group are constituents (a), which are polyvinyl alcohol and/or derivatives of polyvinyl alcohol, with a saponification degree of 90 mol % or more.

3. The hydrophilization treatment agent according to claim 1, wherein the surfactant (D) has a surface tension of 15 to 65 mN/m (25° C., 0.1 mass % aqueous solution, a wilhelmy method).

4. The hydrophilization treatment agent according to claim 1, wherein the surfactant (D) is the non-ionic surfactant.

5. The hydrophilization treatment agent according to claim 1, wherein a combination ratio of (D)/{(A)+(B)+(C)+(D)} is 0.0001 to 0.03 in solid content ratio by weight.

6. The hydrophilization treatment agent according to claim 1, wherein the combination ratio of (C)/{(B)+(D)} is 0.01 to 1.0 in solid content ratio by weight.

7. The hydrophilization treatment agent according to claim 1, wherein the water-soluble resins (A) having a hydroxyl group have a weight average molecular weight of 5,000 to 50,000.

8. The hydrophilization treatment agent according to claim 1, wherein the organoalkoxysilanes (C) comprise at least a constituent having one or more glycidyl groups.

9. The hydrophilization treatment agent according to claim 1, wherein the poorly water-soluble inorganic oxides (B) are inorganic oxides having Si.

10. A hydrophilization treatment method for an aluminum-containing metal material, the method comprising a step of drying after bringing the hydrophilization treatment agent according to claim 1 into contact with the aluminum-containing metal material.

11. A method for producing a hydrophilized aluminum-containing metal material, the method comprising a step of drying after bringing the hydrophilization treatment agent according to claim 1 into contact with the aluminum-containing metal material.

12. A hydrophilized aluminum-containing metal material obtained by the producing method according to claim 11.

13. A heat exchanger using the hydrophilized aluminum-containing metal material according to claim 12.

14. A hydrophilization treatment method for a heat exchanger, the method comprising a step of drying after bringing the hydrophilization treatment agent according to claim 1 into contact with the heat exchanger.

15. A method for manufacturing a hydrophilized heat exchanger, the method comprising a step of drying after bringing the hydrophilization treatment agent according to claim 1 into contact with the heat exchanger.

16. A hydrophilized heat exchanger obtained by the manufacturing method according to claim 15.

* * * * *